United States Patent
Huang et al.

(10) Patent No.: US 7,471,659 B2
(45) Date of Patent: Dec. 30, 2008

(54) METHOD FOR DETERMINING PACKET TRANSMISSION SYSTEM AVAILABILITY FOR PACKET DATA CALL ORIGINATION DURING HYBRID OPERATION

(75) Inventors: Sen-Der Huang, San Diego, CA (US); Don N. Andrus, Encinitas, CA (US); James A. Hutchison, San Diego, CA (US); Rotem Cooper, San Diego, CA (US); Simon Turner, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 794 days.

(21) Appl. No.: 10/434,677

(22) Filed: May 9, 2003

(65) Prior Publication Data

US 2004/0233862 A1 Nov. 25, 2004

(51) Int. Cl.
*H04B 7/216* (2006.01)
(52) U.S. Cl. .......... 370/335; 370/310.2; 370/319; 370/320; 370/321; 370/322; 370/328; 370/329; 455/432.1; 455/435.1; 455/435.2; 455/436; 455/450; 455/466
(58) Field of Classification Search .......... 370/335, 370/310.2, 319–34, 322, 328, 329; 455/432.1, 455/435.1, 435.2, 436, 450, 466
See application file for complete search history.

(56) References Cited

U.S. PATENT DOCUMENTS

| 5,835,858 A | 11/1998 | Vaihoja et al. |
| 5,864,757 A | 1/1999 | Parker |
| 5,953,661 A * | 9/1999 | Schwinghammer et al. . 455/423 |
| 5,974,328 A * | 10/1999 | Lee et al. ................. 455/456.3 |

(Continued)

FOREIGN PATENT DOCUMENTS

WO 9965270 12/1999

(Continued)

OTHER PUBLICATIONS

International Search Report-PCT/US04/014454, International Search Authority European Patent Office, Jun. 12, 2004.

*Primary Examiner*—Stephen M D'Agosta
(74) *Attorney, Agent, or Firm*—Kam T. Tam; Darren M. Simon; Thomas R. Rouse

(57) ABSTRACT

A system and method for determining 1xEV-DO availability for a packet data call in a wireless device is presented. When the wireless device receives a request to initiate a packet data call, the device determines if it currently has access to a preferred 1xEV-DO channel. The determination can be made by consulting a 1xEV-DO availability list stored in persistent memory on the wireless device. If available, the wireless device originates the packet data call on the 1xEV-DO channel. If the device is using a CDMA system that has 1xEV-DO channels but the availability or usability of those channels are unknown, the device polls the signal strength on the 1xEV-DO channels to determine the best 1xEV-DO channel to use for the packet data call. If no 1xEV-DO channel is available or if none of the available 1xEV-DO channels are usable, then the device originates the packet data call on a CDMA channel.

11 Claims, 7 Drawing Sheets

U.S. PATENT DOCUMENTS

| | | | |
|---|---|---|---|
| 6,201,969 B1 * | 3/2001 | Meier | 455/442 |
| 6,343,070 B1 * | 1/2002 | Klas et al. | 370/329 |
| 6,385,179 B1 * | 5/2002 | Malcolm et al. | 370/329 |
| 6,546,250 B1 | 4/2003 | Turcotte et al. | |
| 6,625,451 B1 * | 9/2003 | La Medica et al. | 455/434 |
| 6,879,580 B1 * | 4/2005 | Djuphammar et al. | 370/352 |
| 7,068,669 B2 * | 6/2006 | Abrol et al. | 370/401 |
| 7,099,691 B2 * | 8/2006 | Saito | 455/552.1 |
| 7,245,595 B2 | 7/2007 | Kim et al. | |
| 2002/0105935 A1 * | 8/2002 | Miya | 370/342 |
| 2006/0153134 A1 * | 7/2006 | Lee et al. | 370/331 |

FOREIGN PATENT DOCUMENTS

| | | |
|---|---|---|
| WO | 0158190 | 8/2001 |
| WO | 03036837 | 5/2003 |

* cited by examiner

230 ⟶

| CDMA system | time stamp | SID | NID | frequency band |
|---|---|---|---|---|
| A | 18:56:33.20 | 12345 | 66666 | 1940 |
| B | 18:22:48.35 | 12345 | 77777 | 1942 |
| ⋮ | ⋮ | ⋮ | ⋮ | ⋮ |

METHOD FOR DETERMINING PACKET TRANSMISSION SYSTEM AVAILABILITY FOR PACKET DATA CALL ORIGINATION DURING HYBRID OPERATION

BACKGROUND

1. Field

The present disclosure generally relates to wireless communications and more particularly relates to optimization of packet data communication over a wireless communications network.

2. Related Art

The phenomenal growth of the information technology industry and the Internet in particular, coupled with the consuming public's desire for timely information services, have created a need for a high performance wireless Internet technology. Trends such as PC-on-a-Chip, wireless-capable Personal Digital Assistants, Smart Phones and Auto PCs point to the availability of a large number of new data-capable devices, enabling consumers to communicate wirelessly anytime, anywhere. New technologies are being developed to support these devices by providing high speed wireless Internet services such as CDMA ("1x", "IS-2000", "IS-95B", or "IS-95"), and 1xEV-DO, which is the data optimized "DO" evolution "EV" of the 1x technology.

1xEV-DO technology ("1xEV-DO," "CDMA-DO," "DO", or "HDR") is a high performance and cost effective wireless Internet solution for consumers and business professionals. It offers high speed, high capacity wireless Internet technology, which is compatible with CDMA networks and optimized for packet data services. 1xEV-DO offers a combination of high performance and economic benefits which is unprecedented in systems capable of portable, mobile, and fixed services. 1xEV-DO achieves this performance with minimal network and spectrum resources, providing a highly spectrally efficient technology.

1xEV-DO systems are designed to be highly interoperable with CDMA systems. Within a given wireless network, wireless (i.e., dual-mode) IS-95/1x and 1xEV-DO devices allow consumers to access voice or data services via an IS-95/1x frequency carrier, while receiving optimized data services through a 1xEV-DO frequency carrier. Wireless subscribers benefit from the excellent voice quality of IS-95/1x as well as the high performance data services and mobile flexibility of 1xEV-DO.

Furthermore, 1xEV-DO provides significant performance and economic benefits to wireless operators. The 1xEV-DO technology enables operators to offer advanced data services, make best use of their spectrum and network resources, and offer the highest performance packet data services significantly earlier than alternative technologies. Additionally, 1xEV-DO leverages existing hardware and software design, thus providing significant benefits to equipment manufacturers.

One of the key premises of 1xEV-DO is that voice and data services have significantly different requirements and there will be inefficiencies anytime the two services are combined. With that in mind, the 1xEV-DO design utilizes a frequency carrier separate from the CDMA system. In coverage areas where 1xEV-DO is not available, consumers may have access to data services through the CDMA frequency carrier. For example, wireless devices typically have a CDMA mode optimized for voice, and also providing medium data speeds, as well as a separate 1xEV-DO mode optimized for high capacity/high speed data and Internet access.

This dual-mode capability, however, causes a problem in wireless devices that have access to data services through both CDMA and 1xEV-DO at any given time. Because the 1xEV-DO mode is more efficient and optimized for high capacity/high speed data and Internet access, use of data services in the 1xEV-DO mode is preferred over the CDMA mode. The CDMA and 1xEV-DO channels are separate, and may not always be available at a given moment. Therefore, what is needed is a system and method that allows a wireless device to efficiently handle packet data communications using both the 1xEV-DO and CDMA modes.

SUMMARY

Wireless devices that possess both CDMA and 1xEV-DO capabilities can originate a packet data call using either the CDMA mode or the 1xEV-DO mode. The present disclosure provides systems and methods for managing the use of the dual packet data call modes, wherein the more efficient 1xEV-DO mode that offers higher transmission speed is preferred over the CDMA mode for packet data calls.

When a wireless device receives a request to initiate a packet data call, the device checks to see if it currently has access to a preferred 1xEV-DO channel. If so, the device originates the packet data call on that channel. If the device is using a CDMA system that has 1xEV-DO channels but the availability or usability of those channels are unknown, the device polls the signal strength on the 1xEV-DO channels to select the best 1xEV-DO channel to use for the packet data call. If no 1xEV-DO channel is available or if none of the available 1xEV-DO channels are usable, then the device originates the packet data call on a CDMA channel.

BRIEF DESCRIPTION OF THE DRAWINGS

The details of the present disclosure, both as to its structure and operation, may be gleaned in part by study of the accompanying drawings, in which like reference numerals refer to like parts, and in which.

DETAILED DESCRIPTION

Certain embodiments disclosed herein provide systems and methods for optimizing the placement of packet data calls from a wireless device. For example, one method as disclosed herein allows for a wireless device to test the signal strength of available 1xEV-DO channels prior to originating a packet data call. This test allows the wireless device to use the high speed 1xEV-DO channels when available and use the medium speed CDMA channels otherwise, thereby facilitating more efficient packet data calls from the wireless device.

After reading this description it will become apparent to one skilled in the art how to implement the disclosure in various alternative embodiments and alternative applications. However, although various embodiments of the present disclosure will be described herein, it is understood that these embodiments are presented by way of example only, and not limitation. As such, this detailed description of various alternative embodiments should not be construed to limit the scope or breadth of the present disclosure as set forth in the appended claims.

Figure 1:
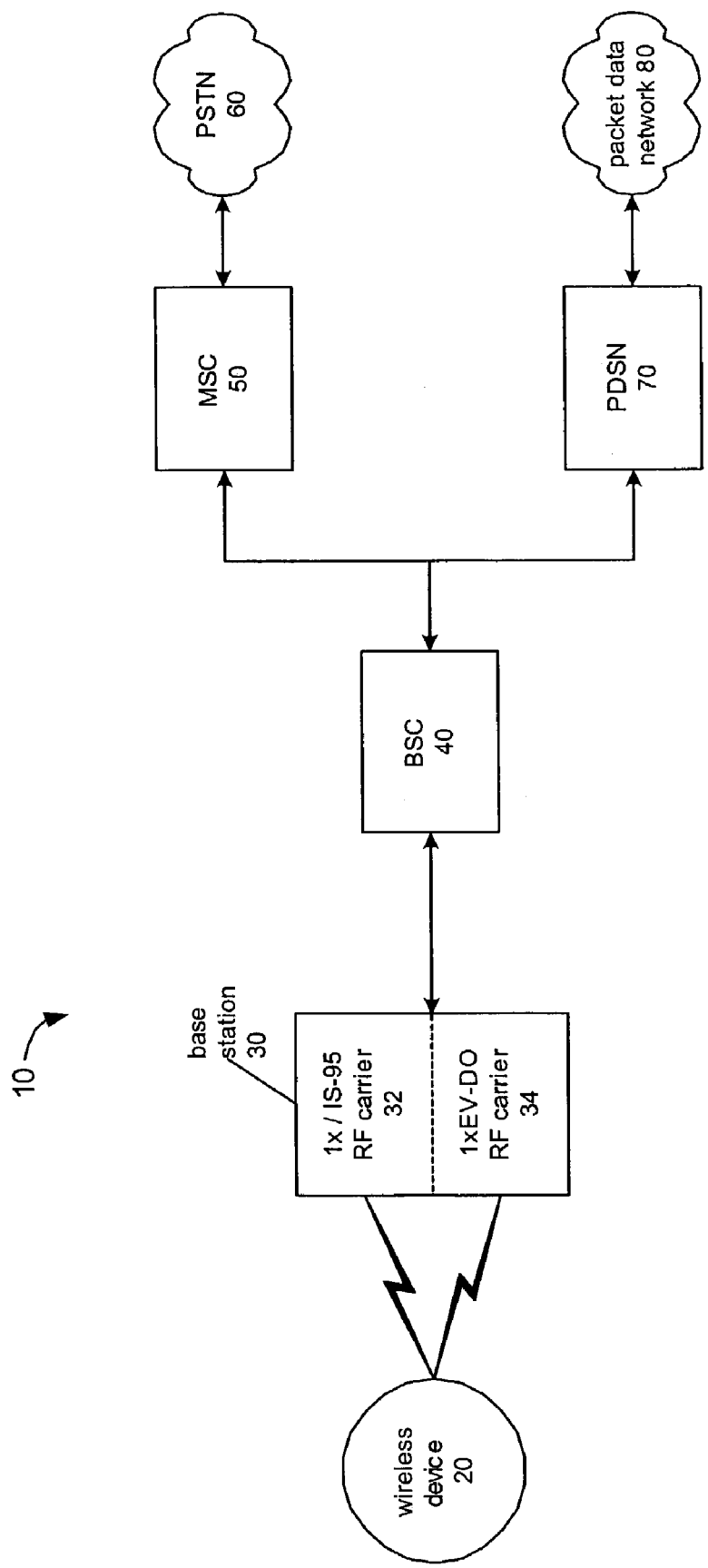
FIG. 1 is a system diagram illustrating an example wireless communication network with a wireless device and a multi-carrier base station, according to an embodiment of the present disclosure.

FIG. 1 is a system diagram illustrating an example wireless communication network 10 with a wireless device 20 and an integrated base station 30. Network 10 also comprises a base station controller 40, communicatively coupled with a mobile switching center 50 and a public switched telephone network 60. Base station controller 40 is also communicatively coupled with a packet data switched network 70 which in turn is connected with a packet data network 80 such as a private local network or the Internet.

Voice and packet data communication over network 10, in general, is well understood in the art and therefore will not be discussed in great detail. In general, voice communications are routed over the wireless link between wireless device 20 and the base station 30 and particularly the 1x/IS-95 RF carrier 32. From the base station 30 the voice communications are routed by the base station controller 40 to the mobile switching center 50 from where the voice communications are directed to the public switched telephone network 60 and a connection is made with the recipient.

Similarly, packet data communications are routed over the wireless link between wireless device 20 and the base station 30 and particularly the 1xEV-DO RF carrier 34. From the base station 30 the packet data communications are routed by the base station controller 40 to the packet data switched network 70 from where the packet data communications are directed to the packet data network 80, which could be the Internet or a public or private local area network ("LAN").

Wireless device 20 can be any of a variety of wireless communication devices including a mobile handset, smart phone, personal digital assistant ("PDA"), PDA with voice capability, personal computer ("PC"), notebook computer, laptop computer, tablet computer, handheld computer, wireless camera, wireless MP3 player, and a wireless video player, just to name a few. Wireless device 20 is capable of communicating over network 10 in voice mode or in data mode. In data mode, wireless device 20 preferably can communicate in both CDMA mode and the optimized 1xEV-DO mode.

When communicating in the optimized 1xEV-DO mode, the design of network 10 and base station 30 requires that a separate CDMA carrier frequency be used. Thus, when in CDMA data mode or IS-95 voice mode, wireless device 20 communicates with the base station 30 in a discrete 1.25 MHz channel. When wireless device 20 is in 1xEV-DO mode it communicates with base station 30 in a separate discrete 1.25 MHz channel. These separate 1.25 MHz channels are managed respectively by 1x/IS-95 radio frequency ("RF") carrier 32 and 1xEV-DO RF carrier 34.

It is, however, important to note that the 1xEV-DO waveform retains one hundred percent compatibility with IS-95/1x from the RF standpoint. The 1xEV-DO waveform uses the same 1.228Mcps chip rate, link budgets, network plans, and RF designs on both wireless devices and infrastructure. Furthermore, optimizing voice and data on different carriers is advantageous for both services because it simplifies system software development and avoids difficult load-balancing tasks. Advantageously, the 1xEV-DO channel is adaptable to operate in any band, including the 450 MHz, 700 MHz, 800 MHz, 1800 MHz, 1900 MHz, 2 GHz, and UMTS bands, just to name a few.

Preferably, the 1xEV-DO forward link uses power efficiently. For example, wireless device 20 continually updates network 10 (i.e., 1xEV-DO RF carrier 34) with the data rate it can receive. With this information the network 10 can service a single user at any instant. Advantageously, the rate control ability allows the 1xEV-DO RF carrier 34 to always transmit at full power achieving very high peak rates when wireless device 20 is in a good coverage area.

In one embodiment, wireless device 20 and 1xEV-DO RF carrier 34 jointly determine the forward link data. For example, the wireless device 20 measures the pilot signal strength and continuously requests an appropriate data rate based on the channel conditions. Correspondingly, the 1xEV-DO RF carrier 34 encodes the forward link at exactly the highest rate that the wireless channel for wireless device 20 can support at any instant.

Figure 2:
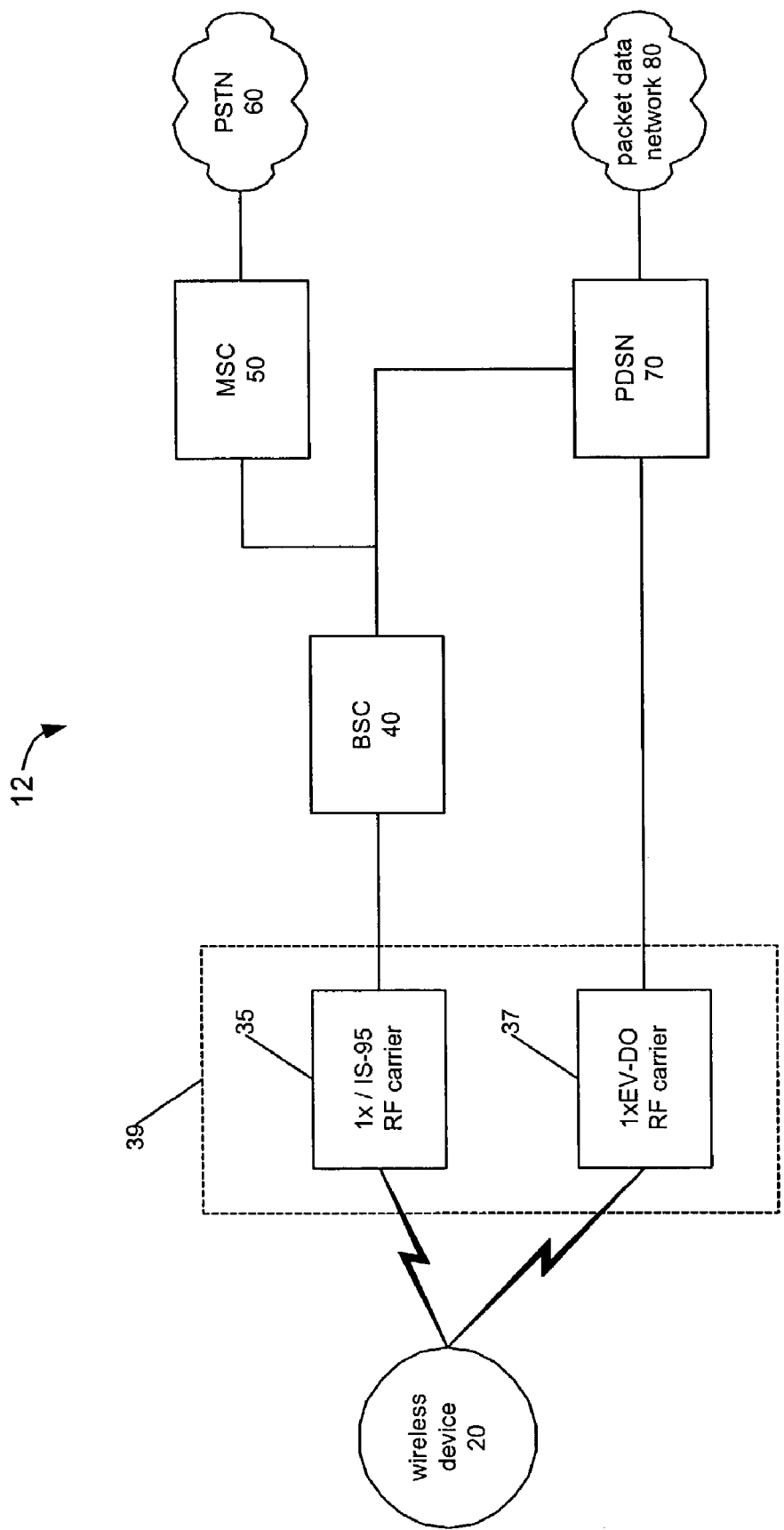
FIG. 2 is a system diagram illustrating an example wireless communication network with a wireless device and a base station co-located with a wireless access point, according to an embodiment of the present disclosure.

FIG. 2 is a system diagram illustrating an example wireless communication network 12 with a wireless device 20 and a base station 35 co-located with a wireless access point 37. The base station 35 and the wireless access point 37 are co-located in an area 39. The base station 35 can be a conventional base station comprising a 1x/IS-95 RF carrier that handles voice communications and CDMA data communications. The wireless access point 37 preferably includes a 1xEV-DO RF carrier that handles 1xEV-DO data communications.

For example, the area 39 can be configured so that the base station 35 and the wireless access point 37 share a physical cell site, including the antenna. Thus, communications received on the first 1.25 MHz channel comprising voice communication and CDMA data communications are provided to the 1x/IS-95 RF carrier while communications received on the second 1.25 MHz channel comprising 1xEV-DO data communications are provided to the 1xEV-DO RF carrier.

In one embodiment, the wireless access point 37 can have a direct connection to a packet data switched network 70, which would in turn route the 1xEV-DO data communications to a packet data network 80 such as the Internet or a local public or private network. Advantageously, such a configuration allows the 1xEV-DO data communication traffic to bypass the base station controller 40. Alternatively and not illustrated, wireless access point 37 could be coupled with a base station controller 40 that would route 1xEV-DO data to the packet data switched network 70.

Figure 3:
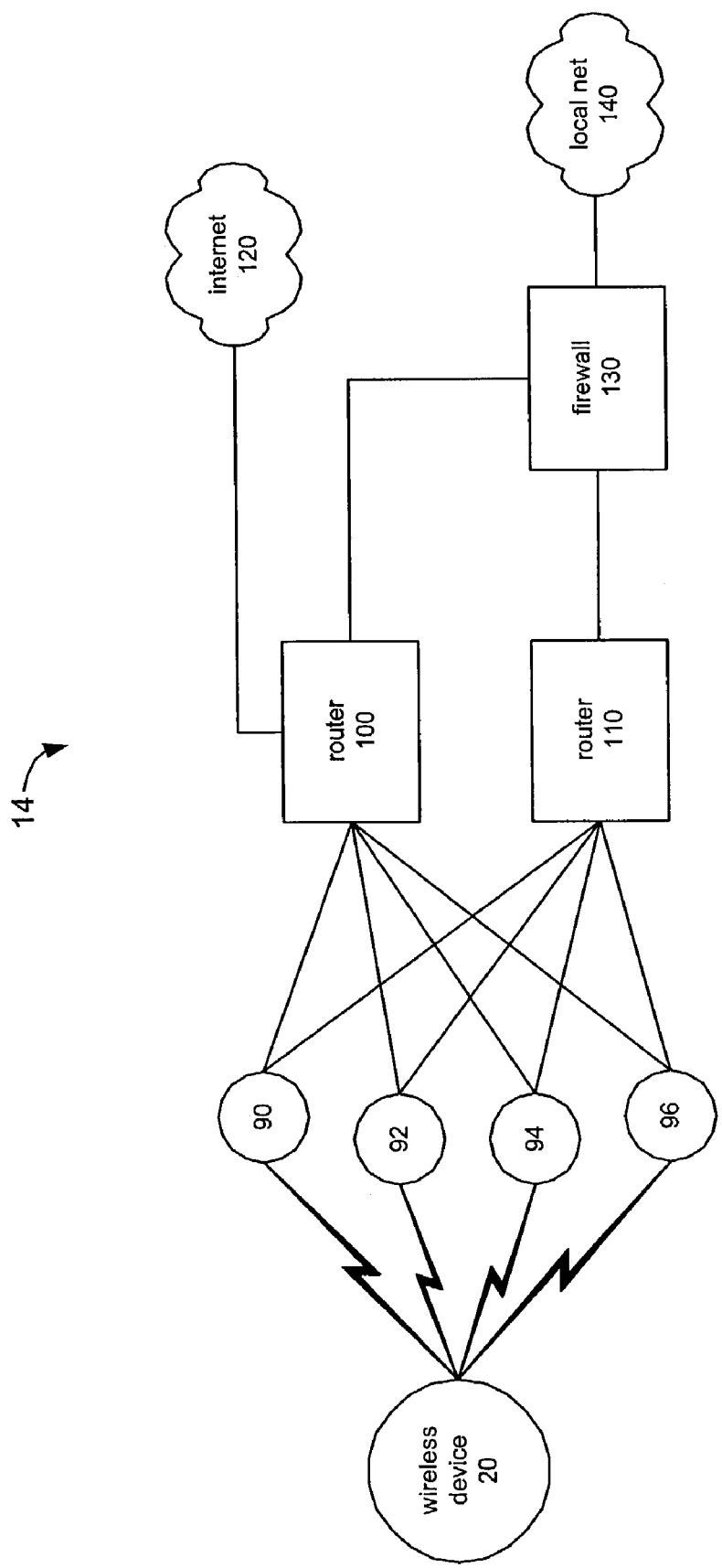
FIG. 3 is a system diagram illustrating an example wireless communication network with a wireless device and a plurality of wireless access point, according to an embodiment of the present disclosure.

FIG. 3 is a system diagram illustrating an example wireless communication network 14 with a wireless device 20 and a plurality of wireless access points 90, 92, 94, and 96. In the illustrated embodiment, the wireless device 20 can communicate with any of the wireless access points 90, 92, 94, and 96 and can also be handed off between the various wireless access points while maintaining a data connection. Preferably, the wireless access points are capable of processing CDMA data communications traffic in addition to 1xEV-DO data communications traffic.

Each of the wireless access points 90, 92, 94, and 96 are communicatively coupled with one or more routers, for example router 100 and router 110. The routers can be in turn connected to various networks including the Internet 120, an a local network 140. In the case of a local network 140, there may be one or more firewalls such as firewall 130 placed between the routers and the local network.

Figure 4:
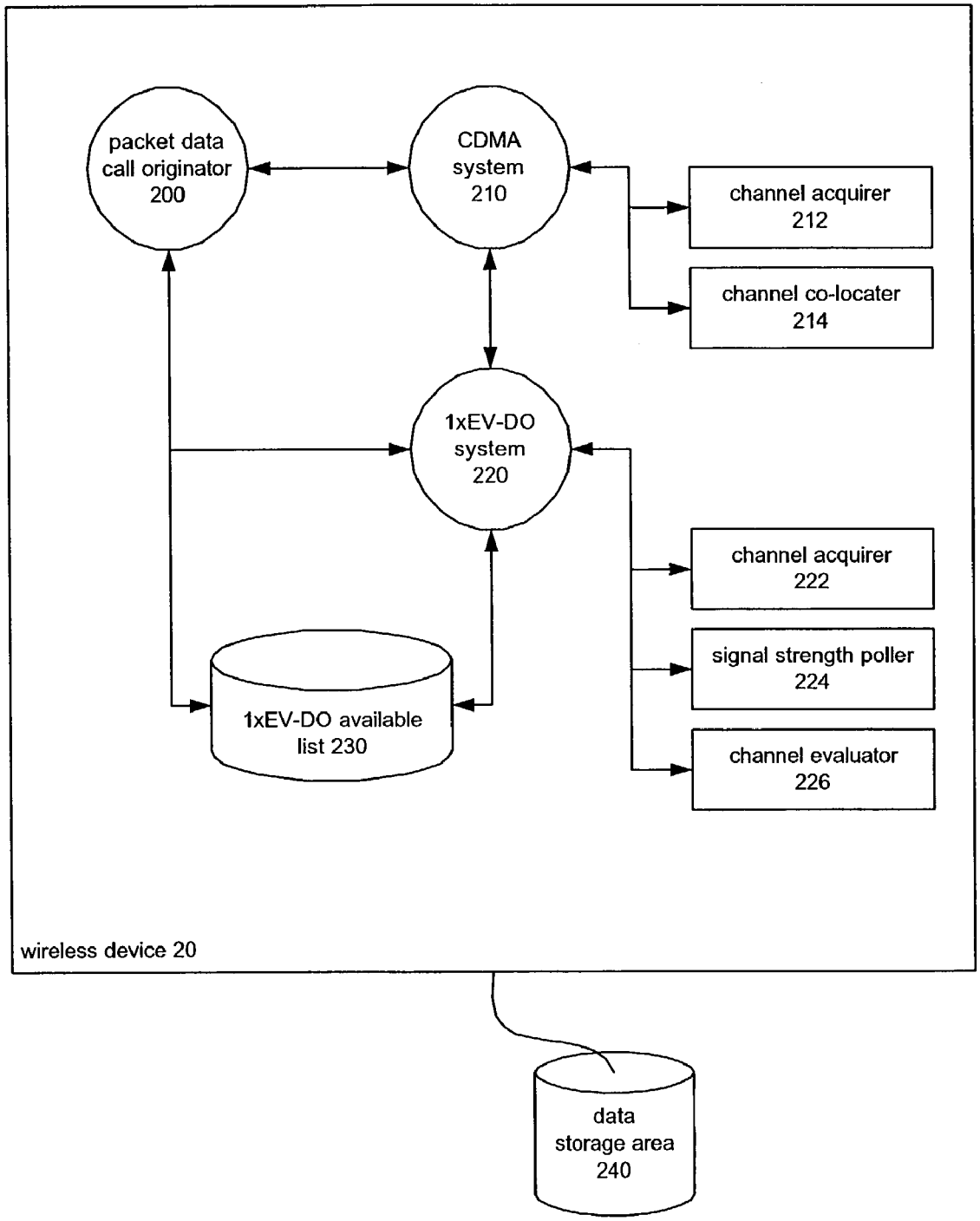
FIG. 4 is a block diagram illustrating an example wireless device, according to an embodiment of the present disclosure.

FIG. 4 is a block diagram illustrating an example wireless device 20. In the illustrated embodiment, wireless device 20 comprises a packet data call originator 200, a CDMA system 210, and a 1xEV-DO system 220. The CDMA system 210 is configured with a channel acquirer 212 and a channel co-locater 214. The 1xEV-DO system 220 is configured with a channel acquirer 222, a signal strength poller 224, and a channel evaluator 226. Additionally, wireless device 20 includes a 1xEV-DO available list 230 that is accessible by the 1xEV-DO system 220 and the packet data call originator 200. The illustrated wireless device 20 also comprises a data storage area 240.

The packet data call originator 200 is configured to receive a packet data call origination request and establish a packet data call with a packet data network. Such a request can be initiated by a user of the wireless device 20. Alternatively, such a request can be initiated by a software program or module executing on the wireless device 20.

The CDMA system 210 is configured to handle both voice and data communications. CDMA system 210 uses a discrete 1.25 MHz channel for the voice and data communications it handles. CDMA system 210 includes channel acquirer 212, which is configured to acquire the 1.25 MHz channel to be used for voice or data communications. CDMA system 210 also includes channel co-locater 214, which is configured to determine what 1xEV-DO channels, if any, are co-located within the particular CDMA system that is acquired for voice communications.

The 1xEV-DO system 220 is configured to handle optimized data communications. 1xEV-DO system 220 also uses a discrete 1.25 MHz channel for data communications. As previously described, this channel is separate with respect to the 1.25 MHz channel used by the CDMA system 210 for voice and data communications. 1xEV-DO system 220 includes channel acquirer 222, which is configured to acquire the 1.25 MHz channel that is used for data communications. 1xEV-DO system 220 also includes signal strength poller 224 and channel evaluator 226, which together determine the suitability of any co-located 1xEV-DO channels within the particular CDMA system that is acquired for voice communications.

The available list 230 that is accessible by the 1xEV-DO system 220 and the packet data call originator 200 is used by the wireless device 20 to maintain the status of CDMA systems that have usable 1xEV-DO channels. For example, if one or more of the channels that are co-located within the CDMA system that is acquired for voice communication are usable for optimized data communications, the CDMA system would appear in the list 230. Advantageously, available list 230 provides the packet data call originator 200 with the ability to determine whether to (1) initiate a packet data call on the CDMA system; (2) initiate a packet data call on the 1xEV-DO system; or (3) query the 1xEV-DO system to determine suitability of any 1xEV-DO channels prior to initiating the packet data call on either the CDMA system or the 1xEV-DO system.

The packet data call originator, CDMA system 210, and the 1xEV-DO system 220, can be implemented as software modules in the wireless device 20, as hardware components of the wireless device 20 or as some combination of software module and hardware component of the wireless device 20.

Preferably, the software module components (i.e., computer executable code) of wireless device 20 are persistently stored in a computer readable medium such as data storage area 240. Alternatively, the software module components may be temporarily stored in a computer readable medium such as data storage area 240, for example the module may be downloaded from an external source for execution purposes and then deleted to more efficiently manage the data storage area 240.

In this description, a computer readable medium is defined as a means for providing executable code, programming instructions, and software to the wireless device 20. The term "computer readable medium" is used to refer to any media used to provide computer executable code (i.e., computer programs or software) to the wireless device 20. Computer programs can be stored in persistent or volatile memory or received from an external source. Such computer programs, when executed, enable the wireless device 20 to carry out its designed functionality, in particular determining 1xEV-DO system availability for packet data calls.

The data storage area 240 may be implemented as a semiconductor-based memory such as dynamic random access memory ("DRAM") and/or static random access memory ("SRAM"). Other semiconductor-based memory types include, for example, synchronous dynamic random access memory ("SDRAM"), pseudo-static random access memory ("PSRAM"), Rambus dynamic random access memory ("RDRAM"), ferroelectric random access memory ("FRAM"), and the like, including read only memory ("ROM").

The data storage area 240 may also be implemented as a hard disk drive and/or a removable storage drive, for example a memory stick, floppy disk, a mini disc, a compact disc ("CD"), a digital versatile disc ("DVD"), etc. Other example implementations of data storage area 240 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Additionally, data storage area 240 may logically comprise one or more databases adaptable for storage of desired information.

Figures 5, 6:
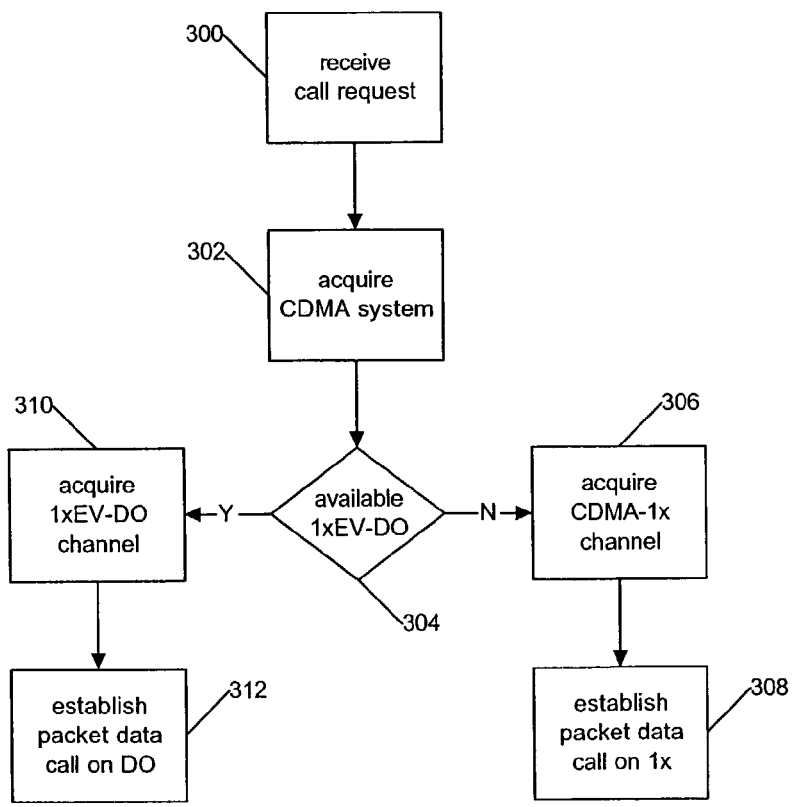
FIG. 5 is a block diagram illustrating an example 1xEV-DO available list, according to an embodiment of the present disclosure.
FIG. 6 is a high level flow diagram illustrating an example process for establishing a packet data call from a wireless device, according to an embodiment of the present disclosure.

FIG. 5 is a block diagram illustrating an example 1xEV-DO available list 230 in tabular format, according to an embodiment of the present disclosure. The available list 230 may be stored in persistent storage on the wireless device, for example in the data storage area 240. The available list 230 can also be temporarily stored in volatile memory (not shown). Alternative data formats may be used in various implementations of the available list 230. Preferably, the data format used for the available list 230 minimizes the data size of the list 230. The available list 230 may be finite in size. For example, the list 230 may be restricted to three or four entries. Alternatively, the list may include as many entries as allowed by the physical limits of the data storage area 240 or the volatile memory (not shown).

The 1xEV-DO available list 230 may comprise one or more entries, with each entry corresponding to a CDMA system. Preferably, each entry includes a timestamp reflecting the last known time that the CDMA system was validated or used for 1xEV-DO packet data communications. Additionally, the each entry can include a system identification ("SID"), a network identification ("NID"), and/or a frequency band. In one embodiment, the SID is a 16-bit code that indicates the service provider and the NID is a 16-bit code that indicates a particular portion of the network (e.g., the current cell). Preferably, the information stored in each entry in the 1xEV-DO available list 230 uniquely identifies a 1xEV-DO channel that can be acquired and used for packet data communications.

FIG. 6 is a high level flow diagram illustrating an example process for establishing a packet data call from a wireless device, according to an embodiment of the present disclosure. Initially, in step 300, the wireless device receives a packet data call request. The call request may come from an internal or external software interrupt or be initiated by a command from the user of the wireless device. Once the device has received the packet data call request, it next acquires a CDMA system in step 302. The process for a wireless device to acquire a CDMA system is well known in the art and will therefore not be described in detail.

After a CDMA system has been acquired, the device next determines whether there are any available 1xEV-DO channels, as illustrated in step 304. This determination can be made by consulting the 1xEV-DO available list as previously described with respect to FIGS. 4 and 5. If there are no available 1xEV-DO channels, the device then acquires a CDMA channel for data communications in step 306 and then establishes a packet data call on the CDMA channel, as illustrated in step 308.

When there are 1xEV-DO channels available, the device then acquires one of the available 1xEV-DO channels as shown in step 310. After acquiring the available 1xEV-DO channel, the device then establishes a packet data call on the acquired 1xEV-DO channel. This data optimized channel is then used for data communications, which is preferable to using the CDMA channel because the 1xEV-DO channel allows for higher bandwidth data communications resulting in more efficient use of the spectrum.

Figure 7:
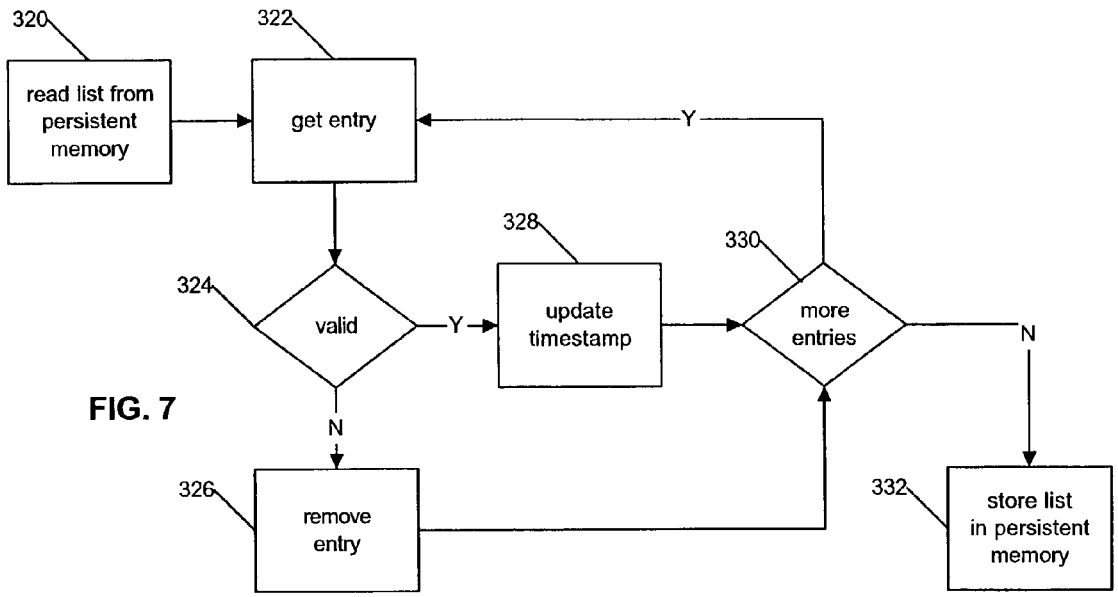
FIG. 7 is a flow diagram illustrating an example process for initializing a 1xEV-DO available list on a wireless device, according to an embodiment of the present disclosure.

FIG. 7 is a flow diagram illustrating an example process for initializing a 1xEV-DO available list on a wireless device, according to an embodiment of the present disclosure. Initially, in step 320 the 1xEV-DO available list is read from persistent storage. The list may also be read from volatile memory. Once the list has been read, the first entry is retrieved as shown in step 322. This first entry is then validated to determine whether the corresponding CDMA system has available 1xEV-DO channels for data communications. If the entry is invalid, in step 326 the entry is removed from the 1xEV-DO available list.

On the other hand, if the entry is valid, then the timestamp associated with the valid entry is updated in step 328 to reflect the current time at which the CDMA system was validated. After either removing the entry or updating the timestamp for the entry, the wireless device determines if there are more entries in the 1xEV-DO available list, as illustrated in step 330. If there are more entries in the list, then the process circles back to get the next entry for validation or removal. If there are no more entries in the 1xEV-DO available list, then the wireless device preferably stores the updated list in persistent memory, as shown in step 332.

Figure 8:
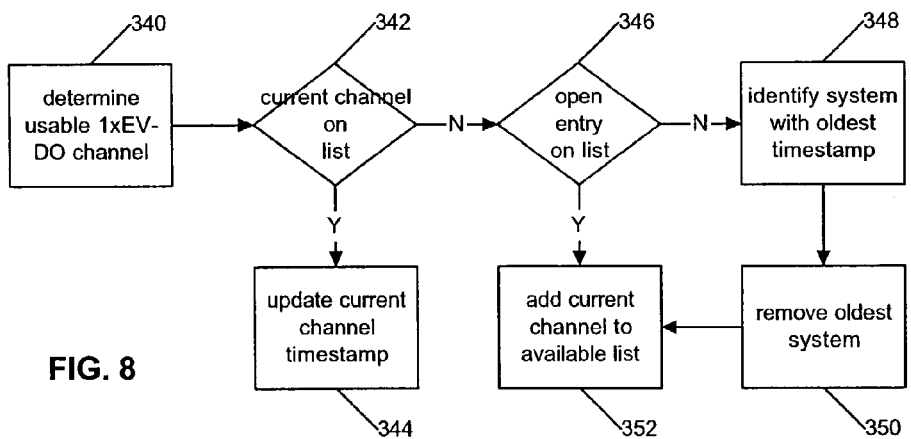
FIG. 8 is a flow diagram illustrating an example process for adding a CDMA system to a 1xEV-DO available list on a wireless device, according to an embodiment of the present disclosure.

FIG. 8 is a flow diagram illustrating an example process for adding a CDMA system to a 1xEV-DO available list on a wireless device, according to an embodiment of the present disclosure. Initially, the wireless device determines a usable 1xEV-DO channel in step 340. This may be accomplished during the normal course of operation, for example when originating a packet data call. Next, in step 342 the wireless device checks to see if the current channel (i.e., the previously determined usable 1xEV-DO channel) is on the 1xEV-DO available list. If the channel is on the list, in step 344 the entry for the channel is updated to reflect a new timestamp corresponding to the time when the channel was recently determined as available.

If the current channel is not on the list, however, in step 346 the 1xEV-DO available list is examined to determine if there are any open entries on the list. For example, the 1xEV-DO available list may contain a finite number of entries, limited by the volatile or persistent memory size or limited by manufacturer policy. If there are not any open entries on the list, in step 348 the wireless device identifies the CDMA system on the list that has the oldest timestamp. Next, in step 350, the CDMA system with the oldest timestamp is removed from the list. In step 352, the current channel is then added to the 1xEV-DO available list. Alternatively, if an open entry was found in step 346, then the current channel is added to the list without removing any entries. In such a fashion, the 1xEV-DO available list may be updated and the most current 1xEV-DO availability can also be maintained.

Figure 9:
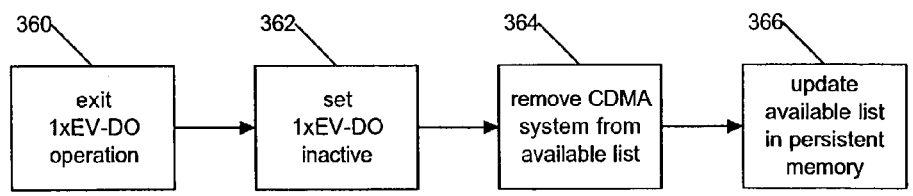
FIG. 9 is a flow diagram illustrating an example process for removing a CDMA system from a 1xEV-DO available list on a wireless device, according to an embodiment of the present disclosure.

FIG. 9 is a flow diagram illustrating an example process for removing a CDMA system from a 1xEV-DO available list on a wireless device, according to an embodiment of the present disclosure. Initially, in step 360, the wireless device exits from 1xEV-DO operation. The exit may be caused by a variety of reasons including a lost signal or other anomalous termination that indicates a problem with the current channel (i.e., the channel in use when termination occurred). Upon exiting the 1xEV-DO operation, in step 362 the device then sets the 1xEV-DO status to inactive. Next, the device removes the current CDMA system from the 1xEV-DO available list, as shown in step 364. Finally, the wireless device updates the 1xEV-DO available list in persistent storage.

In an alternative embodiment where there may be more than one 1xEV-DO channel on a CDMA system, prior to removing a CDMA system from the 1xEV-DO available list, the wireless device may poll the signal strength on expected 1xEV-DO channels of the current CDMA system. If an adequate signal is found and a 1xEV-DO channel is acquired, then the wireless device can instead update the current CDMA system with the new timestamp, SID, NID, and frequency information.

Figure 10:
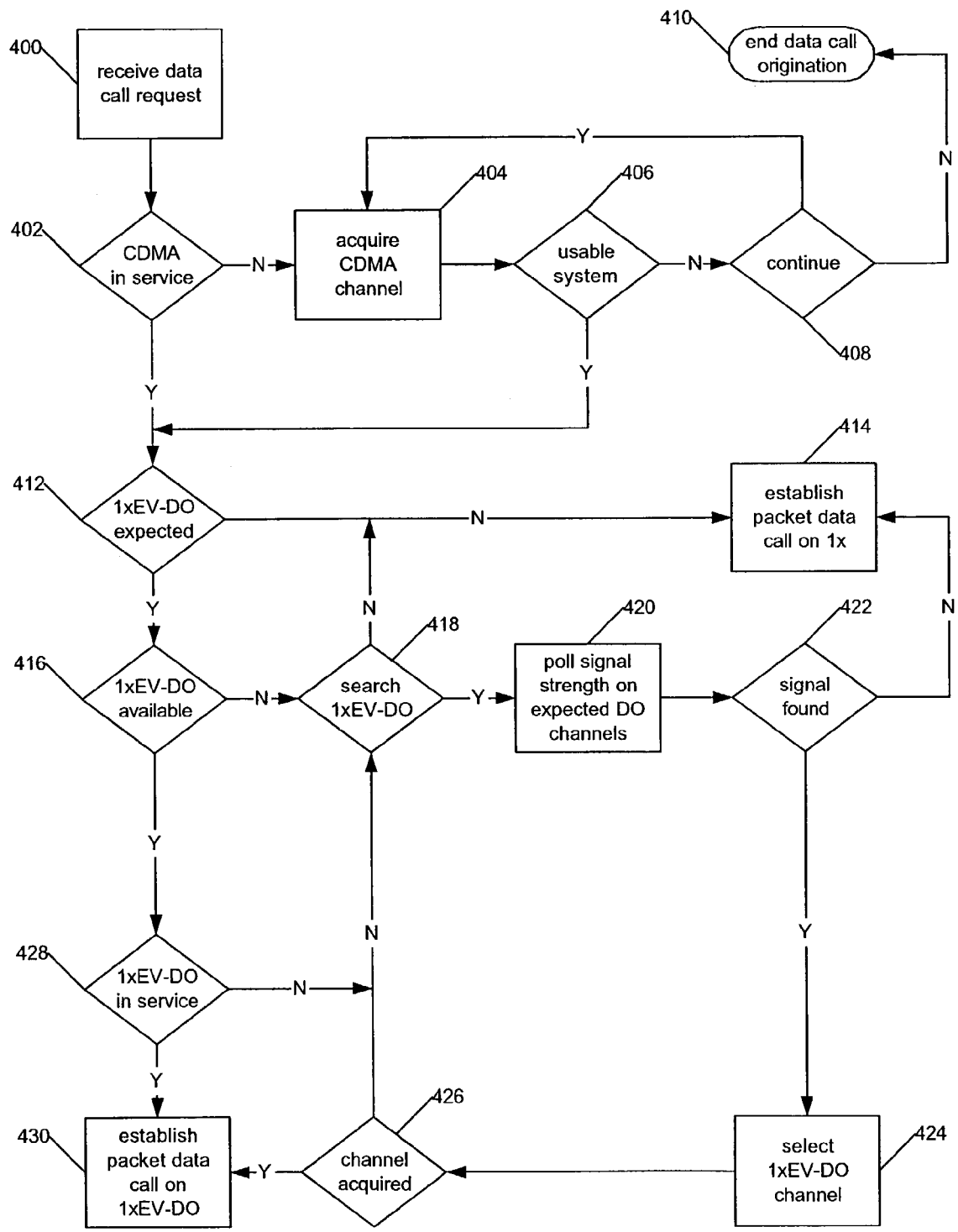
FIG. 10 is a flow diagram illustrating an example process for establishing a packet data call on a wireless device, according to an embodiment of the present disclosure.

FIG. 10 is a flow diagram illustrating an example process for establishing a packet data call on a wireless device, according to an embodiment of the present disclosure. Initially, in step 400, the wireless device receives a packet data call request. The call request may come from an internal or external software interrupt or be initiated by a command from the user of the wireless device. Upon receiving the call request, the device checks to see if the current CDMA system is in service, as illustrated in step 402. If the current CDMA system is not in service, then the wireless device acquires a new CDMA channel, as shown in step 404.

In step 406, the wireless device determines whether the CDMA channel that was acquired is on a usable CDMA system. If the CDMA system is not usable, then in step 408 the wireless device determines whether to continue the packet data call origination. If the packet data call origination is not to be continued, then the wireless device terminates the data call origination in step 410. If the packet data call origination is to be continued, however, then the wireless device goes back to step 404 and acquires another CDMA channel and the process continues.

Alternatively, in step 406 if a CDMA channel is acquired on a CDMA system that is usable, then the wireless device next determines whether any 1xEV-DO channels are expected within the current CDMA system, as illustrated in step 412. For example, the wireless device may consult a preferred roaming list ("PRL") to determine if 1xEV-DO channels are expected within the current CDMA system. In one embodiment, the PRL can preferably be stored in persistent storage on the wireless device. The PRL preferably specifies whether a CDMA system has co-located 1xEV-DO channels. Additionally, a network planner can specify whether the current CDMA system has co-located 1xEV-DO channels in the particular geographic area (i.e., the current cell). If no 1xEV-DO channels are expected, then the wireless device establishes a packet data call using a conventional CDMA channel, as shown in step 414.

If, on the other hand, 1xEV-DO channels are expected in the current CDMA system, then in step 416 the wireless device determines whether the expected 1xEV-DO channels are available for use. In one embodiment, the wireless device can make this determination by consulting the 1xEV-DO available list. If there are no 1xEV-DO channels on the available list, then in step 418 the wireless device determines whether to search for available 1xEV-DO channels. Such a determination may be governed by certain metrics, for example, a time limit that constrains the wireless device's ability to continue searching for a 1xEV-DO channel. If the search is not to continue, then the wireless device establishes a packet data call using a conventional CDMA channel, as shown in step 414.

If, however, the search is to continue, then the wireless device polls the signal strength on expected 1xEV-DO channels, as shown in step 420. If no signals are found in step 422, then the wireless device establishes a packet data call using a conventional CDMA channel, as shown in step 414. If a signal is found on a 1xEV-DO channel, then the 1xEV-DO channel is selected in step 424 for acquisition. In step 426, the wireless device determines if the selected 1xEV-DO channel has been acquired. If the 1xEV-DO channel has been acquired, then in step 430 a packet data call is established on the acquired 1xEV-DO channel.

If the 1xEV-DO channel has not been acquired, then the wireless device loops back to step 418 to determine whether to continue search for another available 1xEV-DO channel. If the search is not to continue, then the wireless device establishes a packet data call using a conventional CDMA channel, as shown in step 414. If the search is to continue, for example as determined by a set of metrics governing the time for establishing a data call or the time allowed for call setup, etc., then the wireless devices resumes with step 420.

Going back to step 416, if the wireless device determines that the expected 1xEV-DO channels are available for use, then the available 1xEV-DO channels are examined to determine if they are in service. If the available 1xEV-DO channels are not available, then the wireless device proceeds to step 418 to determine whether the search for 1xEV-DO channels is to continue, as previously described. If the available 1xEV-DO channels are available, then in step 430 a packet data call is established on an available 1xEV-DO channel.

While the particular embodiments herein shown and described in detail are fully capable of attaining the above described objects of this disclosure, it is to be understood that the description and drawings presented herein represent an embodiment of the disclosure and are therefore representative of the subject matter which is broadly contemplated by the present disclosure. It is further understood that the scope of the present disclosure fully encompasses other embodiments that may become obvious to those skilled in the art and that the scope of the present disclosure is accordingly limited by nothing other than the appended claims.

What is claimed is:

1. A method for optimizing packet data calls in a wireless device configured to communicate packet data over a wireless communication network in a voice and data system mode and a packet transmission system mode, the method comprising:
   receiving a packet data call origination request, wherein receiving the packet data call origination request comprises receiving an internal software interrupt or receiving an external software interrupt;
   consulting a list of available packet transmission system channels in order to determine whether there is at least one available packet transmission system channel, wherein the list of available packet transmission system channels comprises information about one or more packet transmission system channels that can be acquired and used for packet data communications, and wherein the list of available packet transmission channels is stored on the wireless device;
   if an available packet transmission system channel is identified, acquiring the available packet transmission system channel and originating a packet data call on the acquired packet transmission system channel, the packet data call corresponding to the packet data call origination request, wherein acquiring the available packet transmission system channel comprises polling the signal strength of the available packet transmission system channel and determining that the signal strength of the available packet transmission system channel is sufficient to support a packet data call; and
   if there is not a packet transmission system channel that is available, acquiring an available voice and data system channel for data communications and establishing a packet data call on the voice and data system channel.

2. The method of claim 1, further comprising acquiring a CDMA system.

3. A method for validating a list of available packet transmission system channels on a wireless device configured to communicate over a wireless communication network, comprising:
   obtaining a list of available packet transmission system channels from persistent memory, wherein the list of available packet transmission system channels comprises information about one or more packet transmission system channels that can be acquired and used for packet data communications, the one or more packet transmission system channels corresponding to one or more wireless communication systems, wherein the list comprises multiple entries, and wherein each entry in the list corresponds to a particular wireless communication system and comprises a timestamp that indicates the last known time that the wireless communication system was validated or used for packet data communications;
   identifying a wireless communication system from the list of available packet transmission system channels;
   determining that the identified wireless communication system has a packet transmission system channel available for data communications; and
   updating the timestamp in the list of available packet transmission system channels that corresponds to the identified wireless communication system.

4. A method for validating a 1xEV-DO available list on a wireless device configured to communicate over a wireless communication network, comprising:
   obtaining a 1xEV-DO available list from persistent memory, wherein the 1xEV-DO available list comprises information about one or more 1xEV-DO channels that can be acquired and used for packet data communications, the one or more 1xEV-DO channels corresponding to one or more CDMA systems, wherein the list comprises multiple entries, and wherein each entry in the list corresponds to a particular CDMA system and comprises a timestamp that indicates the last known time that the CDMA system was validated or used for 1xEV-DO packet data communications;
   identifying a CDMA system from the 1xEV-DO available list;
   determining that the identified CDMA system does not have a 1xEV-DO channel available for data communications; and
   removing an entry in the 1xEV-DO available list corresponding to the identified CDMA system.

5. A method for a wireless device configured to communicate over a wireless communication network to update a list of available packet transmission system channels having two or more wireless communication systems, the method comprising:
   identifying a new wireless communication system with an available packet transmission system channel;
   identifying a current wireless communication system in the list of available packet transmission system channels, wherein the list of available packet transmission system channels comprises information about one or more packet transmission system channels that can be acquired and used for packet data communications, wherein the list comprises multiple entries, and wherein each entry in the list corresponds to a particular wireless communication system and comprises a timestamp that indicates the last known time that the wireless communication system was validated or used for packet data communications, wherein the one or more packet transmission system channels correspond to the two or more wireless communication systems, the current wireless communication system having the oldest timestamp among the two or more wireless communication systems in the list of available packet transmission system channels;

deleting an entry in the list of available packet transmission system channels corresponding to the current wireless communication system; and storing a new entry in the list of available packet transmission system channels corresponding to the new wireless communication system.

6. A system for optimizing packet data calls in a wireless device configured to communicate over a wireless communication network, the system comprising:

a packet data call originator configured to originate a packet data call over the wireless communication network;

a voice and data system having a first channel acquirer configured to acquire a voice and data system channel;

a packet transmission system having a second channel acquirer and a signal strength poller, the second channel acquirer configured to acquire a packet transmission system channel and the signal strength poller configured to determine the signal strength of the packet transmission system channel, wherein acquiring the packet transmission system channel comprises polling the signal strength of the packet transmission system channel and determining that the signal strength of the available packet transmission system channel is sufficient to support the packet data call; and a list of available packet transmission system channels configured to uniquely identify a wireless communication system with an available packet transmission system channel, wherein the list of available packet transmission system channels comprises information about one or more packet transmission system channels that can be acquired and used for packet data communications, wherein the list of available packet transmission channels is stored on the wireless device, wherein a packet transmission system channel is preferred over a voice and data system channel and the packet data call originator examines the list of available packet transmission system channels prior to originating a packet data call, wherein the packet data call originator examines the list of available packet transmission system channels in response to receiving a packet data call origination request, and wherein receiving the packet data call origination request comprises receiving an internal software interrupt or receiving an external software interrupt.

7. The system of claim 6, wherein the packet transmission system further comprises a channel evaluator configured to determine the signal strength of the packet transmission system channel.

8. A computer readable medium having stored thereon one or more sequences of instructions for causing one or more microprocessors to perform the steps for optimizing packet data calls in a wireless device configured to communicate over a wireless communication network, the steps comprising:

receiving a packet data call origination request, wherein receiving the packet data call origination request comprises receiving an internal software interrupt or receiving an external software interrupt;

consulting a list of available packet transmission system channels in order to determine whether there is at least one available packet transmission system channel, wherein the list of available packet transmission system channels comprises information about one or more packet transmission system channels that can be acquired and used for packet data communications, and wherein the list of available packet transmission channels is stored on the wireless device;

if an available packet transmission system channel is identified, acquiring the available packet transmission system channel and originating a packet data call on the acquired packet transmission system channel, the packet data call corresponding to the packet data call origination request, wherein acquiring the available packet transmission system channel comprises polling the signal strength of the available packet transmission system channel and determining that the signal strength of the available packet transmission system channel is sufficient to support a packet data call; and if there is not a packet transmission system channel that is available, acquiring an available voice and data system channel for data communications and establishing a packet data call on the voice and data system channel.

9. The computer readable medium of claim 8, wherein the instructions for performing the receiving step comprise receiving an internal software interrupt.

10. The computer readable medium of claim 8, wherein the instructions for performing the receiving step comprise receiving an external software interrupt.

11. The computer readable medium of claim 8, wherein the instructions cause the one or more microprocessors to further perform the step of acquiring a CDMA system.

* * * * *